Figure 1:
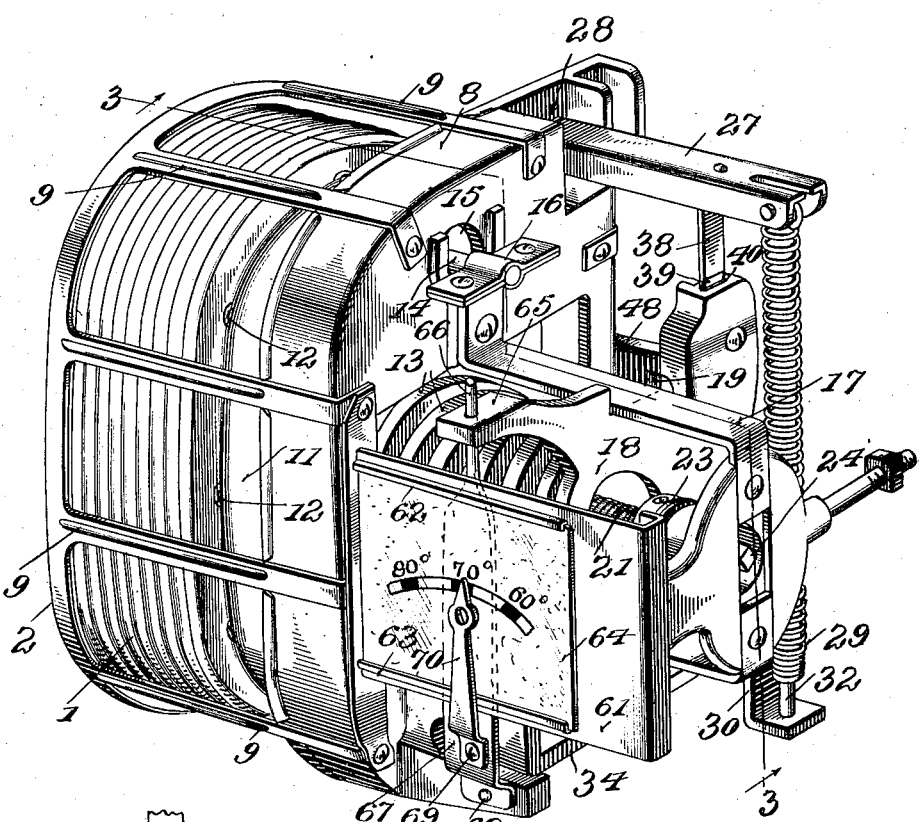

W. M. FULTON.
TEMPERATURE REGULATOR.
APPLICATION FILED MAR. 18, 1909.

987,712.

Patented Mar. 28, 1911.
4 SHEETS—SHEET 1.

Witnesses
Gustave R. Thompson
Mary A. Wood

Inventor
Weston M. Fulton
By Mauro, Cameron, Lewis & Massie
Attorneys

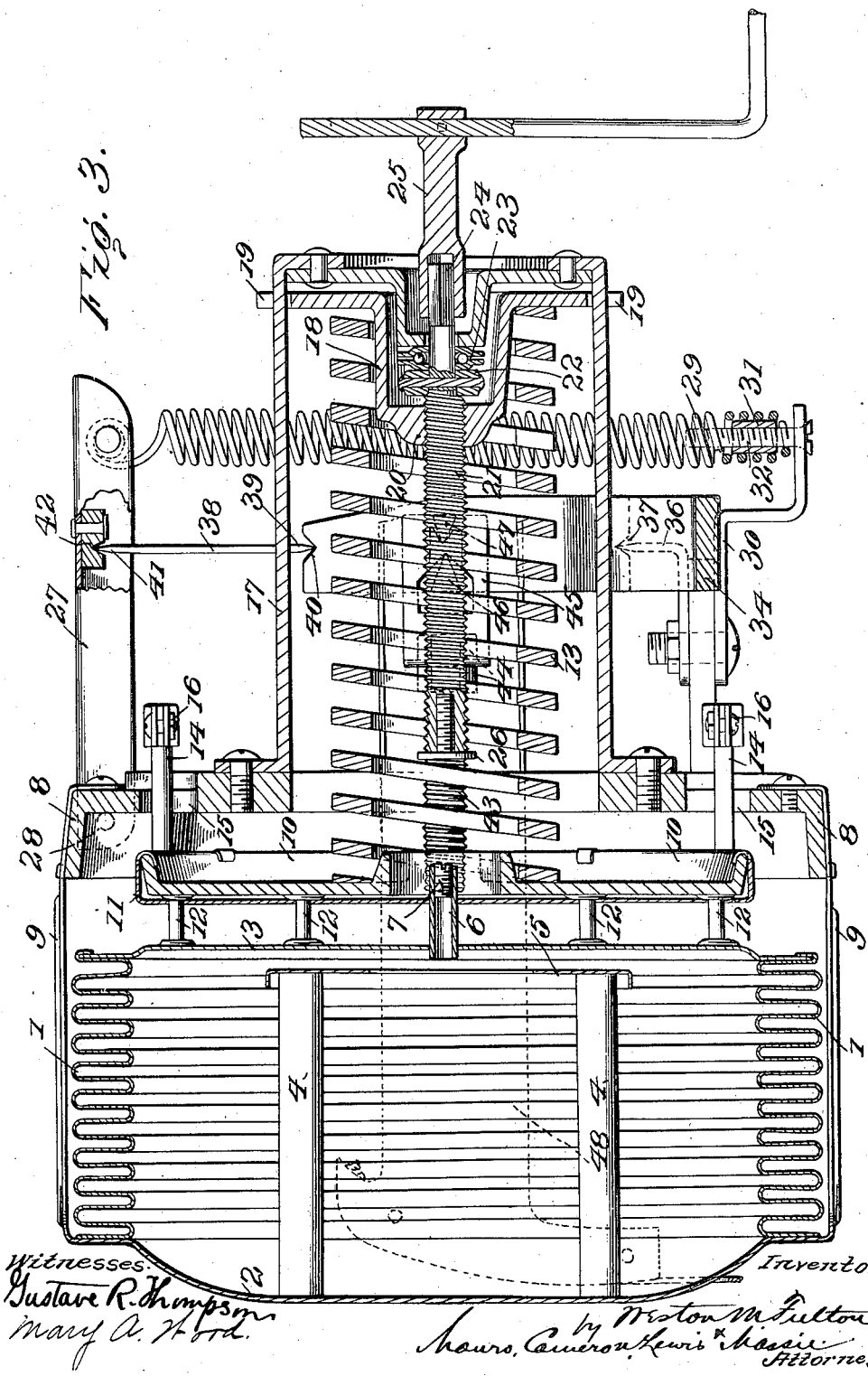

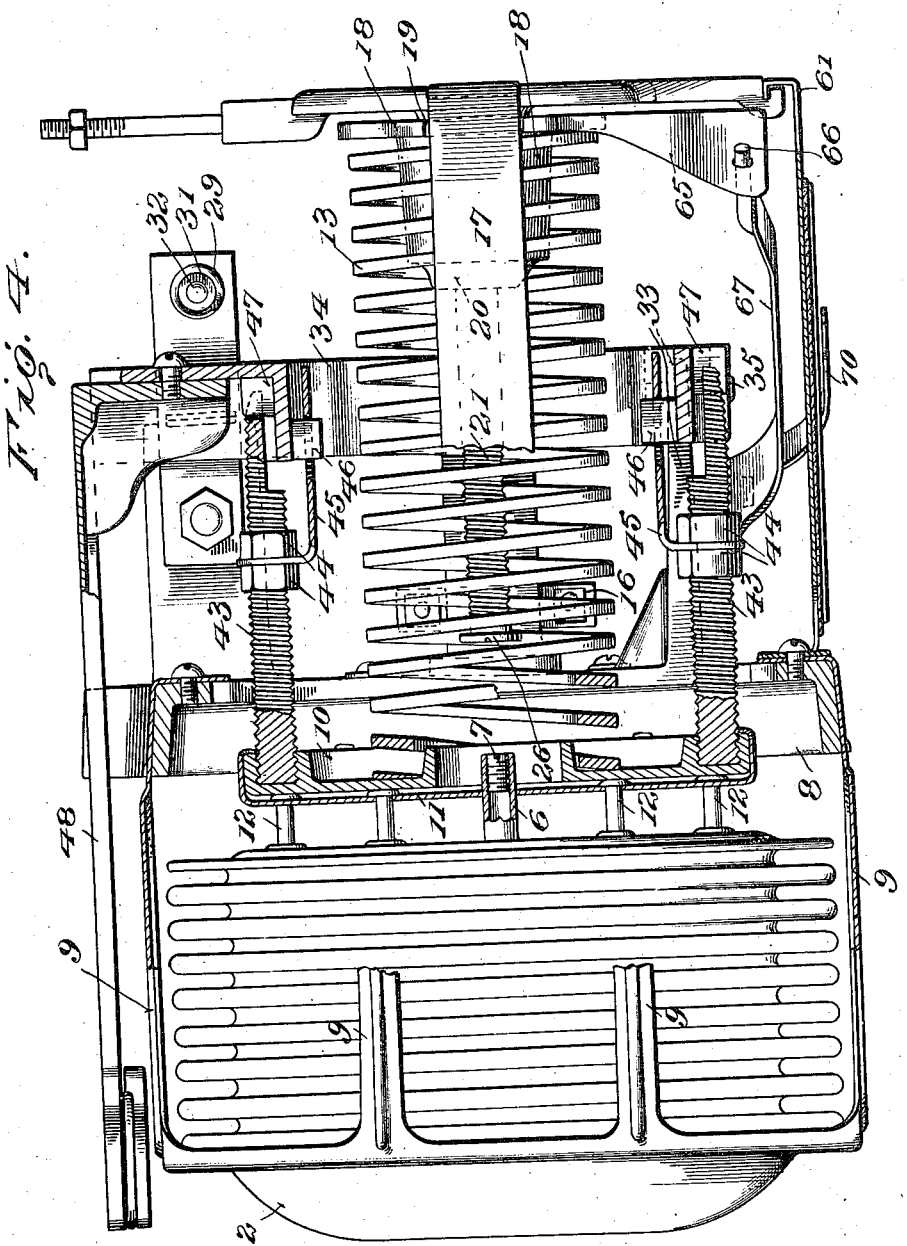

W. M. FULTON.
TEMPERATURE REGULATOR.
APPLICATION FILED MAR. 18, 1909.
987,712.
Patented Mar. 28, 1911.
4 SHEETS—SHEET 4.
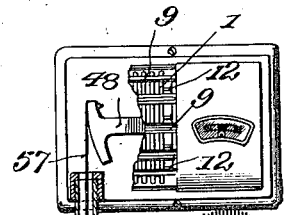
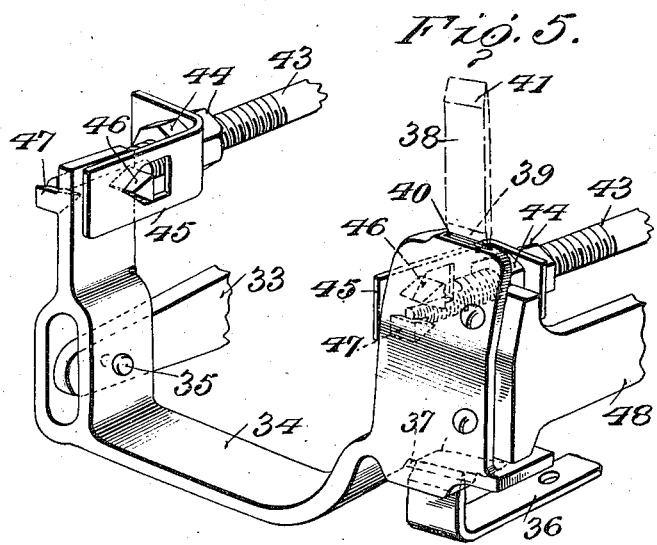
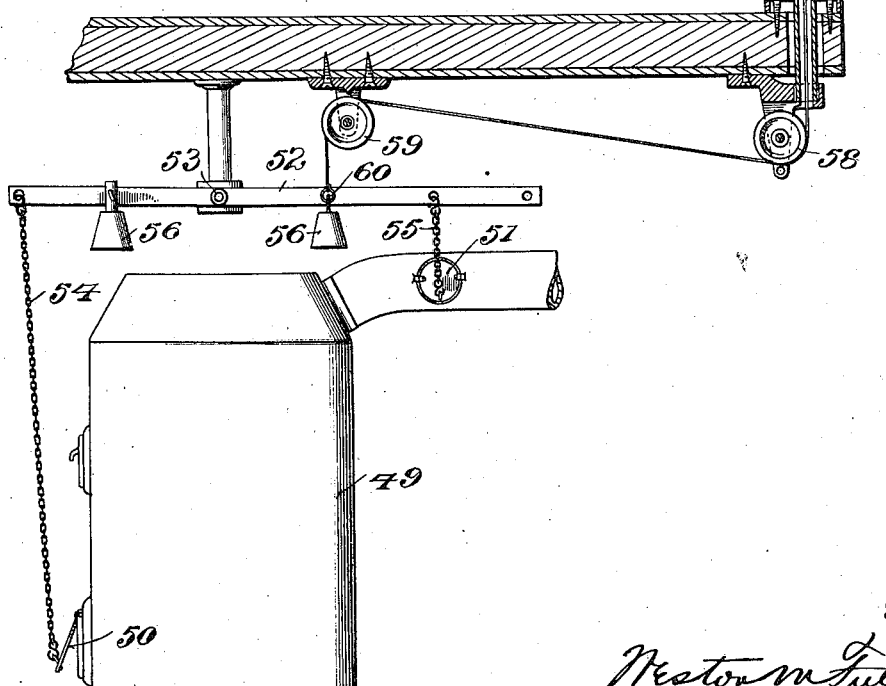
Inventor
Weston M. Fulton
by
Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

TEMPERATURE-REGULATOR.

987,712.

Specification of Letters Patent. Patented Mar. 28, 1911.

Application filed March 18, 1909. Serial No. 484,273.

*To all whom it may concern:*

Be it known that I, WESTON M. FULTON, of Knoxville, Tennessee, have invented a new and useful Improvement in Temperature-Regulators, which invention is fully set forth in the following specification.

This invention relates to temperature regulators, that is, to that class of devices designed to be affected by the temperature of the air, gas, liquid or other fluid, and as the result of changes in the temperature of such fluid to operate suitable devices for controlling the source of heat. In this class of devices, it is extremely desirable that the structure should be one of great sensitiveness to changes in temperature, to the end that it may act promptly under such changes of temperature, and also that it should be powerful enough to readily operate the mechanism for controlling the source of heat. For the sake of appearances, it is also desirable that it should not be bulky. For example, when located in a room of a dwelling, it should not be large and conspicuous. It has heretofore been proposed to employ expansible and collapsible vessels of metal, in devices of this character, as the medium for effecting the movements which control the source of heat, as for example, a furnace, (through its damper). Generally, a suitable fluid is inclosed within the metallic expansible and collapsible vessel, and the expansion or contraction of the vessel, and consequently the movements of the devices for controlling the source of heat, are designed to be in exact accordance with the expansion or contraction of the fluid confined within the expansible or collapsible vessel. I have found, however, when metallic vessels are used (and such vessels as constructed by me are far superior to vessels of any non-metallic substance) as the expansible and collapsible element, that the movement of the parts is materially affected by reason of the resiliency of the metal constituting the expansible and collapsible vessel, and are not dependent alone upon the expansion or contraction of the fluid within the vessel due to the changes in temperature. Moreover, I have found that it is desirable to place such vessels under initial compression by the use of a suitable tension device, as a spring, and that the movements of the parts are more or less affected by the resiliency of the spring or other tension device employed.

The object of the present invention is to provide a temperature regulator which shall be sensitive to slight variations in temperature; which shall impart movements to the temperature-controlling apparatus in proportion to the expansion and contraction of a suitable fluid sensitive to changes in temperature; which shall neutralize the resiliency of the metallic vessel in which said fluid is contained, as well as the resiliency of the tension device employed for placing the same under tension; and which shall be compact; and notwithstanding its sensitiveness and delicacy of operation, shall nevertheless be powerful and efficient.

If a body is exposed to changes in temperature, the rate at which it will be affected by such changes is dependent upon its physical properties, such as its mass, the area of its exposed surfaces, the nature of the material constituting the exposed surface, its specific heat, conductivity for heat, etc., and in the present invention I therefore employ a thermo-sensitive device in the form of an expansible and collapsible vessel, composed of a suitable metal, such as brass. This vessel is so constructed as to expose a surface of great area, while the mass of the metal embodied in the vessel is very small. This is accomplished by making the walls quite thin, and by forming very deep, heavy corrugations therein, so that a very small amount of metal will present an extended surface to the air or other medium conveying the changes in temperature. I select a metal having great heat conductivity, such as brass, mentioned above, and I inclose in such vessel the vapor of a liquid whose specific heat and latent heat of vaporization are low; whose vapor tension varies at an approximately uniform rate within the limits of operation of the regulator, say from 60° to 80° F.; and which is chemically neutral toward the materials of which the vessel is composed, so as to avoid any chemical action on the interior wall of the vessel. I have discovered that ethyl chlorid possesses these very desirable qualities to a high degree, and hence that the vapors of ethyl chlorid are particularly adapted for use in regulators constructed according to the present invention.

The inventive idea involved is capable of receiving a variety of mechanical expressions, one of which, for the purpose of illustrating the invention, is shown in the accompanying drawings, in which drawings—

Figure 2:
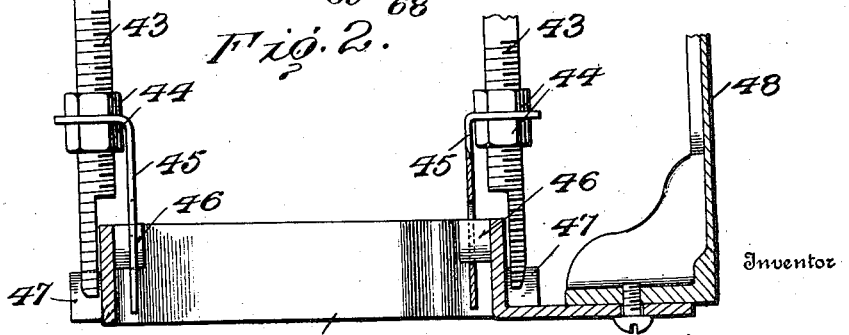

Figure 1 is a perspective view of the regulator; Fig. 2 is a sectional detail of a yoke employed to transmit power from the thermo-sensitive vessel to the point where the power is to be applied; Fig. 3 is a vertical section on the line 3—3, Fig. 1; Fig. 4 is a side elevation, with parts broken away to show the construction; Fig. 5 is a perspective view of the yoke shown in Fig. 2; and Fig. 6 is a diagrammatic view showing the manner of applying the regulator to the damper of a furnace to control the combustion therein.

Referring to the drawings, in which like reference numerals indicate like parts throughout the several views, the thermo-sensitive portion of the regulator consists of a thin, flexible, deeply corrugated sheet metal wall 1, preferably of brass or copper, closed at each end by the thin metal walls 2 and 3, which are also preferably of brass or copper. The wall 2 is preferably made concave, so as to possess maximum strength with minimum thickness. Within the vessel, and as herein shown supported upon the end wall 2, are tubular posts 4, 4, preferably secured together at their upper ends by a thin strip 5, the proportion of the parts being such as to limit the collapse of the flexible wall 1 by reason of the contact of the end wall 3 with posts 4, 4, when the vessel has collapsed to a predetermined point. A suitable volatile liquid, such as ethyl chlorid, is introduced into the expansible and collapsible vessel through the tube 6 (Fig. 3), after which the tube is closed in any suitable manner, as by means of plug 7, thereby confining the liquid and its vapor in the collapsible and expansible vessel.

As thus constructed, the expansible and collapsible vessel possesses the following desirable qualities: First, the convolutions thereof give a large surface area condensed into a small space. Secondly, the shape of the wall gives maximum strength, to the end that it may withstand the pressure exerted by the vapor of the confined liquid, which maximum strength is obtained while employing a minimum mass of material to construct the vessel, since by reason of the deep corrugations, very thin metal can be used in its construction without danger of rupture. Thirdly, the thinness of the wall of the vessel permits a rapid exchange of heat by conduction between the gas or liquid to which the vessel may be exposed on the outside and the volatile liquid on the inside thereof. Fourthly, since all the walls of the vessel are made of a metal having high conductivity for heat, the sensitiveness of the vessel to variations in temperature is very great.

The collapsible and expansible vessel thus constructed is supported from a casting 8 by means of narrow bracket arms 9, widely spaced so as to secure a free exposure of the walls of the vessel to the atmosphere, to the end that the air can circulate around it without material obstruction. A metal casting 10 has a sheet metal casing 11 clamped or otherwise secured thereto, and a series of hollow studs 12 are soldered at their lower ends to the wall 3 of the expansible and collapsible vessel, and at their upper ends pass through the sheet metal casing 11, and have their ends burred out, so that they are securely fastened to the casing 11. These hollow studs 12 serve to connect the casting 10 to the expansible and collapsible vessel, while at the same time very largely insulating the casting from the vessel, so that there is no ready conduction of heat from one to the other. The casting 10 constitutes a head-piece upon which rests one end of the spring 13, and at each end of said head-piece 10 there is an upwardly projecting rod 14 extending through an opening 15 in the casting 8, and carrying on its upper end the cross-bar 16 of a length greater than the diameter of the hole 15 in the casting 8. These cross-bars 16 afford an additional means, exterior to the expansible and collapsible vessel, to limit the collapse thereof to a predetermined point, since when the vessel has collapsed to the point desired, the cross-bars 16 will contact with the casting 8 and prevent the further collapse of the vessel. The limit of the expansion of the expansible and collapsible vessel is reached when the head-piece 10 contacts with the under-surface of the casting 8 (see Fig. 3). It will thus be seen that the range of expansion and contraction of the vessel is confined within certain definite limits, and that no material exchange of heat can take place between the collapsible and expansible vessel and the head-piece 10. This latter is desirable because of the fact that the head-piece 10 having a greater mass than the wall 3 of the expansible and collapsible vessel, tends to lag behind the changes of temperature to which the regulator may be exposed, and if it were not thus insulated from the vessel, it would render the action of the latter sluggish in its response to temperature changes.

Mounted on the casting 8 is the yoke 17, which serves as a guide for a follow-block 18, which has parts cut away, as at 19, Fig. 1, so as to embrace the yoke on opposite sides and move freely up and down thereon. This follow-block has a female screw-thread 20 in its central depressed portion, within which works a male screw 21, the upper end of which carries a collar 22 riveted or otherwise secured thereto, between which collar and the central portion of the yoke 19, there is an anti-frictional bearing, as for example, a ball bearing 23. The upper portion of the yoke 17 has a central perforation through which the reduced upper end of the screw 21 passes, and the projecting exterior end thereof is squared, as shown at 24, to receive a key 25, by means of which the screw may be turned. The follow-block 18 rests upon the upper end of the spring 13, and it will be readily understood that by turning the screw, the tension of the spring upon the head-piece 10, and hence upon the expansible and collapsible vessel, may be readily adjusted. For the purpose of preventing the screw from being run out of the follow-block, the lower end thereof is provided with a suitable enlargement, as for example, a large-headed screw 26 screwed into the end of the screw 21.

A lever 27 is pivoted at 28 to the casting 8, and to its upper end is secured one end of a spring 29, the other end of which is secured to the arm 30 projecting upward from the casting 8 to which it is rigidly secured, the connection between the spring 29 and the arm 30 being by means of a nut 31 secured to the end of the spring, and a screw 32 passing through the arm 30 and into the nut 31, so that the tension of the spring 29 may be thereby adjusted.

Projecting from and rigidly secured to the casting 8 on one side thereof is a post 33 (Figs. 4 and 5), and 34 is a yoke, one of whose arms is pivoted to the post 33, as at 35, so that the yoke is hung on that side to turn on said pivot 35. On the opposite side, the yoke is supported by means of a knife-edge 36, also rigidly supported from the casting 8, which knife-edge takes into a groove 37 in the yoke 34, and opposing the knife-edge 36 is a bar 38 having one knife-edge 39 taking into a groove 40 in the yoke, and another knife-edge 41 taking into a groove 42 in the side of the pivoted lever 27, the parts being so constructed and arranged that the yoke on that side may turn between the knife-edges 36 and 39, and the parts all held in position by the tension of the spring 29, which holds the lever 27 firmly up against the bar 38.

Referring to Figs. 4 and 5, 43, 43, are screw-threaded rods secured at their lower ends to the opposite sides of the head-piece 10, as clearly shown in Fig. 4, and bearing on their upper ends nuts 44, 44, carrying between them slotted arms 45, taking over knife edges 46 projecting outward from the sides of the arms of the yoke 34. The ends of the screws project some distance through the nuts 44, and at their extreme outer ends said screws bear against knife-edges 47 projecting outward from the outer sides of the arms of the yoke 34.

From this construction, it will be seen that when the thermo-sensitive vessel expands, the screws 43, 43, transmit the tension by way of the knife-edges 47, 47, to the yoke 34, rocking it on the pivot 35 on one side, and between the knife-edges 36 and 39 on the other side; and when said vessel collapses, the yoke is caused to rock in the opposite direction. Moreover, the construction described is such as to cause the spring 29, acting through the lever 27, to neutralize the resilience of the flexible wall 1, and also the resilience of the spring 13, as will be more fully pointed out later on.

Attached to the yoke 34 is an arm 48, which partakes of the oscillations of the yoke 34, and through which the movements of expansion and contraction of the expansible and collapsible vessel may be utilized to control the source of heat, as for example, to control the furnace 49, Fig. 6, by opening or closing the dampers 50 and 51. This is effected by attaching a lever 52, pivoted at 53, to the two dampers by suitable connections, as chains 54, 55, the proper operation of the parts being controlled by adjustable weights 56, 56. Attached to the lever 48 on the regulator is a cable 57, which is conducted over suitable pulleys 58 and 59 to the lever 52, to which it is attached at 60. It will be readily understood that an elevation of the lever 48 will effect a pull on the cable 57, thereby effecting a greater or less closure of the damper 50 and opening of the damper 51, and upon a reverse movement of the lever arm 48 there will be a greater or less closing of the damper 51 and opening of the damper 50.

Referring to Fig. 1, 61 is a suitable index-holder, upon which there is mounted in any suitable way, as by sliding in the grooved ways 62 and 63, a card or other device 64, having marked thereon a scale, as clearly shown in said Fig. 1. In this instance the scale indicates variations in degrees from 60° F. to 80° F. The follower block 18 (see Fig. 1) has an arm 65 in which engages the reduced end 66 of a lever 67, pivoted at 68 to the framework of the machine, and passing beyond the plate 61. Secured to said lever 67 at 69 is an index finger 70, operating in conjunction with the scale on the card 64. The parts of this index-finger and scale are so arranged that they will indicate the amount of compression of the spring 13, and hence the amount of tension upon the expansible and collapsible vessel.

The parts being constructed and assembled as above described, the operation is as follows:—The expansible and collapsible vessel is filled with the vapors of a suitable volatile liquid, as for example, the vapors of ethyl chlorid, the liquid passing into the vessel through the tube 6, which is then closed by the plug 7. Preferably, the amount of the volatile liquid contained in the vessel is such that when the vessel is collapsed to the greatest extent to which it is desired to be employed, it will be completely filled with the vapors of the liquid, without any of the liquid being present in liquid form. The volatile liquid, as ethyl chlorid, being placed in the vessel, and the same being closed as indicated above, and it being assumed that the device is being used, for example, for controlling the temperature of a room, and maintaining the same substantially at 70° F., the key 25 is operated to turn the screw 21 and compress the spring 13, and thus apply tension to the expansible and collapsible vessel, until the indicator-finger 70 points to 70° on the scale, as shown in Fig. 1. At this point, the tension of the spring 13, acting through the head-plate 10, and hollow insulating studs 12 against the wall 3 of the expansible and collapsible vessel, is just sufficient to overcome the tension of the vapor of the volatile liquid within the vessel, which is tending to force the wall 3 outward against the spring 13. If now, the temperature in the room where the regulator is located rises slightly above 70° F., heat is quickly conducted through the thin walls of the vessel to the vapor confined therein, thereby causing an increase in the tension of the vapor, and overcoming the tension of the spring 13, and forcing the wall 3 outward, which movement of the wall is transmitted through the screw-rods 43, 43, to the yoke 34, thereby rocking the yoke outward, and transmitting a corresponding movement to the lever arm 48, which in Fig. 6 would be an upward movement, resulting in a greater or less closure of the damper 50, and opening of the check damper 51. This checks the consumption of fuel in the furnace so as to reduce the amount of heat furnished to the room in which the regulator is located. Should the temperature in the room fall, the heat of the vapor within the vessel is quickly conducted through the thin walls of the expansible and collapsible vessel to the outside atmosphere, and this loss of heat reduces the tension of the vapor inside of the vessel, so that the spring 13 overcomes the same and collapses the vessel, thereby causing lever 48 to fall, thus closing the check damper 51 and opening the draft damper 50, thereby allowing an increase in the combustion of fuel, with a corresponding increase of heat in the room in which the regulator is located. The counterpoise weights 56, 56, are so adjusted on the lever 52 that there will be slightly more weight on the right-hand end, as seen in Fig. 6, than on the left-hand end. In these movements of expansion and collapse of the expansible and collapsible vessel, it is desirable that such movements should correspond as nearly as possible to the increased or decreased tension of the vapors of the volatile liquid within the vessel. Inasmuch, however, as the walls of the vessel and the spring 13 are resilient, the expansion on increase of tension of the vapor will be more or less affected by the resiliency of the expansible and collapsible vessel, and on the other hand, the contraction of the vessel will be more or less influenced by the resiliency of the spring 13 bearing on the headpiece 10. It is for the purpose of neutralizing this resiliency of the expansible and collapsible wall 1 and of the spring 13 that the spring 29 is employed, acting on the expansible and collapsible vessel through the lever 27 and the yoke 34. If the parts are suitably adjusted, the knife-edge bar 38 should be approximately parallel with the wall 3 of the expansible and collapsible vessel when the index-finger 70 points to 70° on the index-card. If now, a rise in temperature occurs, the increased tension of the vapor within the expansible and collapsible vessel acts through the screw rods 43 to rock the yoke 34 outward, but this movement is more or less resisted by the resiliency of the spring 13. The outward movement of the yoke 34, however, rocks the bar 38 from its position parallel with the end plate 3 of the expansible and collapsible vessel, and the tension of the spring 29 is therefore added to that of the vapor within the expansible and collapsible vessel, tending to rock the yoke outward, and the tension of this spring 29 being properly adjusted, it acts to neutralize the resiliency of the spring 13, so that the outward movement of the yoke is proportional to the increase in tension of the vapor within the expansible and collapsible vessel. Conversely, if there is a fall in temperature, resulting in a collapse of the expansible and collapsible vessel, the collapse of the vessel is more or less resisted by the resiliency of the walls 1 of said vessel. But the initial collapse in movement rocks the knife-edge 39 downward, throwing the bar 38 out of parallel with the head 3 of the expansible and collapsible vessel, whereupon the tension of the spring 29 acts in opposition to, and neutralizes the resiliency of, the walls 1 of the expansible and collapsible vessel, so that the collapse of the vessel is approximately proportional to the decrease in tension of the vapors confined within said vessel.

While as herein illustrated, I have shown my device as applied to controlling the temperature in a room, it will be understood that the same may be employed in controlling a great variety of devices, as steam or gas valves, or in operating hot-air registers and the like, and the illustration of the same to the control of dampers in a furnace is not to be taken as limiting the invention to such particular devices.

It will be observed that the expansible and collapsible vessel upon which the accuracy of movement of the parts depends, is, (by reason of the manner of its support through the medium of the arms 9, 9, of small mass, and its connection to the head-piece 10 through the hollow insulating studs or posts 12), insulated for all practical purposes from the other parts of the structure. This is important in securing delicacy and promptness of operation of the device, since if the same were not thus insulated, the operations of the device would be much more sluggish, and hence less effective in securing prompt control of the temperature. It will also be observed that by making the walls of the expansible and collapsible vessel of very thin metal, and of great heat conductivity, which walls, however, present a large surface to the air or other medium, there is provided means for the ready transmission of heat from the air or other medium to the vapor within the vessel, and this also contributes to the delicacy and prompt operation of the device as a whole.

While for the purpose of illustrating the invention, I have thus described one embodiment thereof in detail, it will, of course, be apparent to those skilled in the art that there may be various modifications in the proportion and arrangement of parts, and that other forms of tension devices than the specific ones shown and described may be employed, without departing from the spirit of my invention, and the claims appended are designed to include all such modifications.

What is claimed is:—

1. In a temperature regulator, the combination of a resilient expansible and collapsible vessel, a resilient tension device normally placing said vessel under tension, means for automatically applying power to said tension device when said vessel expands or contracts from a predetermined volume, and means operated by said vessel on expansion or contraction to control the source of heat.

2. In a temperature regulator, the combination of an expansible and collapsible vessel, a head-piece carried thereby but insulated therefrom, an adjustable abutment, a spring reacting between said head-piece and said abutment, means for automatically applying power to said spring when said vessel expands or contracts from a predetermined volume, and means operated by said vessel on expansion or contraction to control the source of heat.

3. In a temperature regulator, the combination of an expansible and collapsible vessel containing ethyl chlorid vapor, a tension device normally placing said vessel under compression, means for automatically applying power to said tension device when said vessel expands or contracts from a predetermined volume, and means operated by said vessel on expansion or collapse to control the source of heat.

4. In a temperature regulator, the combination of an expansible and collapsible vessel having resilient walls and inclosing a thermo-sensitive fluid, a resilient tension device normally holding said vessel under compression, and means acting in opposition to the resiliency of said walls on a decrease in the temperature of said fluid below a predetermined temperature for which the device is set, said means also acting in opposition to said tension device on an increase in the temperature of said fluid above said temperature.

5. In a temperature regulator, the combination of an expansible and collapsible vessel, a spring reacting between said vessel and a suitable abutment and tending to compress said vessel, and a second spring adapted to apply power to said first-named spring when said vessel expands or contracts from a predetermined volume.

6. In a temperature regulator, the combination of an expansible and collapsible vessel having resilient walls and inclosing a thermo-sensitive fluid, a tension device normally tending to compress said vessel, a rocking element in operative relation with said vessel, whereby the movements of expansion or contraction of said vessel act to rock said element, and a spring in operative relation with said rocking element and acting to assist in the rocking thereof upon the expansion or contraction of said vessel.

7. In a temperature regulator, the combination of a support, a corrugated collapsible and expansible vessel having one end fast to said support, a head piece carried by the opposite and movable end of said vessel and insulated therefrom, a tension device normally applying pressure to said vessel through said head piece, a rocking member mounted on said support, adjustable power transmitting means between said head piece and said rocking member and spring-operated means for applying force to said member to assist in the rocking thereof upon the expansion or contraction of said vessel.

8. In a temperature regulator, the combination of an expansible and collapsible vessel having one end stationary and the opposite end movable, a yoke member adapted to be tilted by the collapse and expansion of said vessel, said yoke member having a pivot support and knife-edge supports in alinement with each other, means for transmitting power from said vessel to said yoke to rock the same, and means acting through one of said knife-edge supports to apply power to tilt said yoke.

9. In a temperature regulator, the combination of an expansible and collapsible vessel having one end stationary and the opposite end movable, a yoke member adapted to be tilted by the collapse and expansion of said vessel, adjustable power-transmitting means between said vessel and said yoke, a tension device normally applying pressure to said vessel, means for regulating said tension device, a spring for applying power through said yoke to said tension device when said vessel expands or contracts from a predetermined volume, and means connected with said yoke for transmitting power as described.

In testimony whereof I have signed this specification in the presence of two subscribing witnesses.

WESTON M. FULTON.

Witnesses:
JOHN I. BROWN,
MARGARET COOMES.